Feb. 8, 1949.  H. E. GEIZER ET AL  2,460,880
UNIVERSAL ATTACHMENT STAND
Filed Feb. 20, 1946
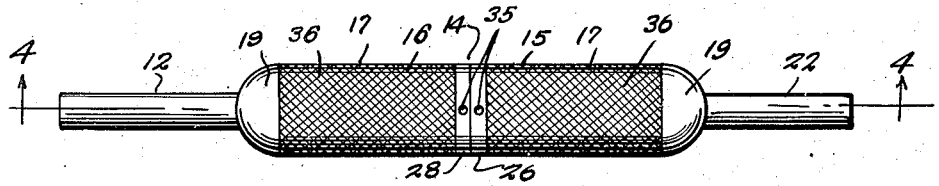
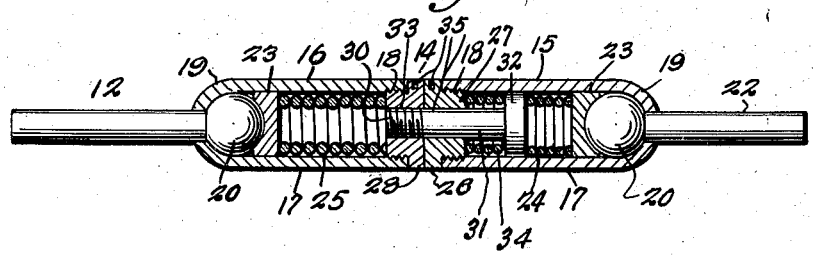
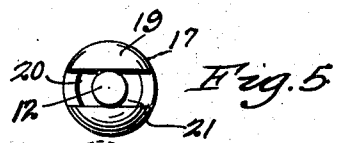
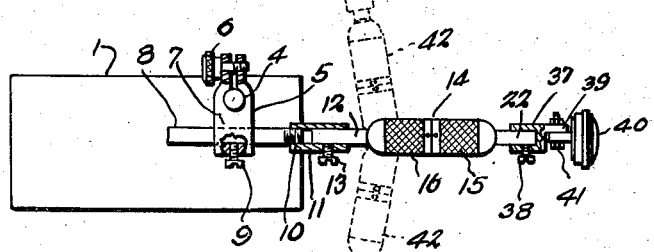
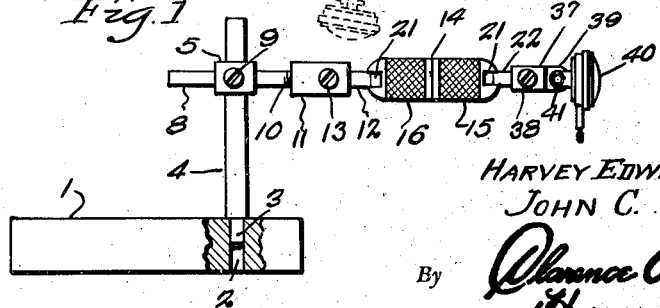
Inventor
HARVEY EDWARD GEIZER
JOHN C. GEIZER JR.
By Clarence A. O'Brien
and Harvey B. Jacobson
Attorneys Patented Feb. 8, 1949

2,460,880

UNITED STATES PATENT OFFICE 2,460,880

UNIVERSAL ATTACHMENT STAND

Harvey Edward Geizer, Mentor, and John C. Geizer, Jr., Cleveland, Ohio

Application February 20, 1946, Serial No. 648,923

1 Claim. (Cl. 287—87)

Our invention relates to novel and useful improvements and structural refinements in universal attachment stands, and applies particularly to those used for adjustable mounting of dial indicators. In stands conventionally employed for this purpose, a plurality of rods, slidable clamps and adjustable couplings are usually used for attaching the indicator to a solid base, and by loosening the knurled set screws with which such clamps and couplings are customarily provided and by rotating or sliding the associated rods, the indicator can be adjusted in several positions and at various angles with respect to the work.

However, the adjustment of a multitude of set screws often becomes a tedious task and if particular care is not taken to tighten each screw securely, a carefully planned adjustment is often easily disturbed by undesirable shifting of the rods when the indicator is placed in operation.

It is therefore the principal object of this invention to provide a device of the character herein described, in which the number of adjusting set screws employed is reduced to a minimum, and where a universal attachment, adjustable under resilient pressure, is used for supporting the indicator.

A further object of the invention is to provide a stand which will facilitate the use of the indicator in restricted locations, where gages supported by conventional means could not be satisfactorily employed.

Another object of the invention is to provide a stand which is easily adjustable, yet in which the adjustment cannot be easily disturbed when the indicator is being used.

A still further object of the invention is to provide a stand which is of simple construction and which may be readily disassembled for cleaning or for repair purposes.

With the above more important objects in view, and such other objects as may become apparent as this specification proceeds, the invention consists essentially of the arrangement and construction of parts as illustrated in the accompanying drawings, in which:

Figure 1 is a side elevation of the stand.

Figure 2 is a plan view of the same.

Figure 3 is a longitudinal, side elevational view of the universal attachment, per se.

Figure 4 is a cross-sectional view taken on the plane of the line 4—4 in Figure 3.

Figure 5 is an end view of one of the casings used in the universal attachment.

Like characters of reference are used to designate like parts in the specification and throughout the several views.

Referring now to the accompanying drawings in detail, the invention consists of a base plate 1 provided with an aperture 2 into which is pressed, the lower, reduced end 3 of a vertical standard 4. The latter is of a circular cross-sectional configuration and carries an adjustable clamp 5 of conventional design, which is slidable on the standard and may be secured at any desired height thereon by tightening the set screw 6. The clamp 5 is also provided with a horizontal bore 7 in which is a slidable extension arm 8. This extension arm may be secured in any desired position by tightening the set screw 9, and is screw-threaded at the end 10 thereof, to engage an internally-threaded bore of a coupling 11.

The remaining end of this coupling receives the end of an extension link 12, which is secured therein by means of the set screw 13. The link 12 constitutes a part of the universal attachment assembly 14 which is the essence of this invention, and is clearly illustrated in the accompanying Figures 3, 4 and 5.

The assembly 14 comprises a pair of longitudinally aligned, complemental members 15 and 16, consisting of cylindrical casings 17 and provided with an internally-threaded portion 18 at the adjacent ends thereof. The remaining end of each casing is rounded in the illustrated manner, to provide a semi-spherical socket 19, designed to receive a swivel ball 20. One of these balls is formed integrally with the afore-mentioned link 12 which protrudes out of the member 16 through a transverse slot 21 formed in the socket 19, while the remaining of said balls is formed integrally with an extension link 22, protruding through a similar slot formed in the socket end of the member 15.

Slidable in each of the casings 17 are the concave followers 23, which are urged against the balls 20 by means of the compression springs 24 and 25. A cap 26, provided with an externally threaded adapter 27 is screwed into the internally threaded portion 18 of the member 15 and a similar cap 28 engages the like portion formed in the member 16. The cap 26 is provided with a central aperture 29 through which extends the shank 30 of a swivel bolt 31, the head 32 of which is slidable inside the casing 17 of the member 15.

The threaded end of the shank 30 is secured in a threaded bore 33 formed centrally in the cap 28, and the members 15 and 16 are held together in frictional contact by the resiliency of a coil spring 34, interposed between the cap 26 and the underside of the head 32.

The afore-mentioned springs 24 and 25 extend from the followers 23 to the head 32 and the cap 28 respectively, and it will be noted that when assembled, the members 15 and 16 may be independently rotated about the axis thereof.

A plurality of blind apertures 35 are provided on the periphery of the caps 26 and 28, whereby the latter may be tightened against the ends of the casings 17 by using a suitable hand bar. In addition, a knurled surface 36 is formed on the outside of the casings, so that the same may be conveniently rotated, or easily drawn apart against the resiliency of the spring 34, when it is desired to disassemble the various components for repairs.

With reference to the illustrated structure remaining undescribed in the accompanying Figures 1 and 2, the afore-mentioned link 22 carries at the free end thereof an adaptor 37, which is secured thereon by means of a set screw 38. This adaptor is, in turn, provided with a projecting shoulder 39 to which is attached the dial indicator 40 by means of a bolt 41.

When the invention is placed in operation, the clamp 5 and the adaptor 37 should first be adjusted so as to hold the indicator 40 in approximately the required position, whereupon the indicator may be moved in any required direction and through any desired angle by the combined virtues of the universal attachment assembly 14. This attachment, in addition to the adjustment provided by the clamp 5 and the adaptor 37, facilitates independent rotation of the casings 17, and provides for lateral movement of both the links 12 and 22 in the slots 21, as exemplified by the phantom lines 42.

It should, of course, be understood that the lines 42 indicate only two of several, countless positions to which the attachment may be adjusted and while, in order to preserve clearness in the drawings, no further positions have been shown, the possibility of various other adjustments and combinations of adjustments will be readily apparent.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

A universal connector comprising in combination, a pair of independently rotatable substantially tubular housing members disposed in a longitudinally aligned relation, abutting caps provided at the adjacent ends of said members, the remaining ends of said members forming substantially semi-spherical sockets and being provided with diametrically extending slots, a ball positioned in each of said sockets, laterally swingable extension rods secured to said balls and projecting outwardly through said slots, spring pressed followers provided in said members and engaging said balls, a coupling element separably and rotatably connecting said members together, and a compression spring associated with said element for normally urging said caps into the abutting relation.

HARVEY EDWARD GEIZER.
JOHN C. GEIZER, JR.

REFERENCES CITED

The following references are of record in the file of this patent:

UNITED STATES PATENTS

| Number | Name | Date |
| --- | --- | --- |
| 1,124,006 | Parker | July 19, 1938 |
| 2,298,176 | Schwartz | Oct. 6, 1942 |
| 2,298,516 | Streib | Oct. 13, 1942 |

FOREIGN PATENTS

| Number | Country | Date |
| --- | --- | --- |
| 635,871 | Germany | Feb. 2, 1935 |
| 357,004 | Great Britain | Sept. 17, 1931 |